United States Patent Office 3,790,559
Patented Feb. 5, 1974

3,790,559
PRODUCTION OF ERYTHROMYCYLAMINE
COMPOUNDS
Eric Wildsmith, Chamberley, England, assignor to Lilly
Industries, Ltd., Henrietta Place, London, England
No Drawing. Filed Mar. 17, 1971, Ser. No. 125,399
Claims priority, application United Kingdom, Apr. 13,
1970, 17,527/70
Int. Cl. C07c 129/18
U.S. Cl. 260—210 E                                6 Claims

ABSTRACT OF THE DISCLOSURE

Erythromycylamine compounds are produced by subjecting an erythromycin hydrazone azine or imine to reduction by means of a highly electropositive metal or additionally, in the case of the imine, to reduction by means of a complex metal hydride. A process is also provided for preparing the novel imines, which are useful as antibiotic agents, particularly against gram-positive organisms.

---

Attempts to convert erythromycin into therapeutically useful erythromycylamine compounds have been made hitherto but the only published methods—see E. H. Massey et al., Tetrahedron Letters, 157 (1970)—require catalytic reduction of erythromycin hydrazone or its N′-isopropylidene derivative using platinum oxide as catalyst in glacial acetic acid solution, or a similar catalytic reduction of erythromycin oxime. Both of these methods are effective but require either high hydrogen pressures or long reaction times and the use of very large and uneconomic catalyst to substrate ratios. In United Kingdom patent specification No. 1,100,504, it is also stated that the "oxime" may be reduced using sodium borohydride to the required "amine" but it has subsequently been shown—see the aforementioned paper by Massey et al.—that the "oxime" used in that specification is in fact the hydrochloride salt thereof and that the so-called reduction to the amine produces no more than the oxime base of that salt. Accordingly, the uneconomic catalytic process is the only viable published process for obtaining erythromycylamine. The present invention is therefore concerned with providing an improved process for preparing erythromycylamine compounds.

Accordingly, the present invention provides a process for preparing erythromycylamine compounds of the formula:

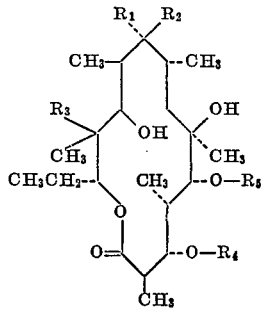

I wherein $R_1$ and $R_2$ are different and are hydrogen or an amino group, $R_3$ is a hydrogen atom or a hydroxy group, $R_4$ is a cladinosyl group and $R_5$ is a desosaminyl group, which process comprises subjecting an erythromycin derivative of the formula:

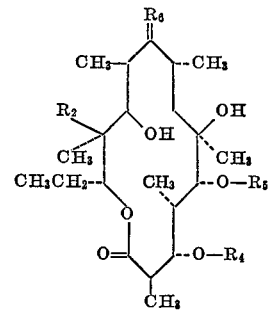

II wherein $R_3$, $R_4$ and $R_5$ are as defined above, $R_6$ is a

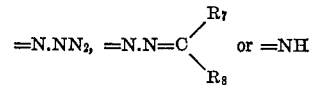

group, and either $R_7$ is hydrogen or $C_{1-4}$ alkyl and $R_8$ is $C_{1-4}$ alkyl, phenyl, nitrophenyl or tolyl or $R_7$ and $R_8$ together with the adjacent carbon represent $C_{5-7}$ cycloalkylidene, to reduction by means of a highly electropositive metal such as sodium or aluminium preferably in the form of an amalgam or additionally, when $R_6$ is an $=NH$, i.e. imino group, by means of a suitable complex metal hydride, for example sodium or potassium borohydride.

In the reductions involving the use of a highly electropositive metal, the reaction is normally carried out in a suitable solvent, for example diethyl ether, at room temperature and pressure with the reaction mixture being agitated. The reaction is normally completed within from about 1 to 6 hours although, especially in the case of the reduction of the hydrazone or azine intermediates, the yield may be improved by allowing the reaction to proceed overnight. The reduction of the imino intermediate using hydrogen over a suitable catalyst is normally carried out at low pressure, for example around 60 p.s.i., for periods up to 24 hours whilst reduction of the imine effected with a complex metal hydride proceeds rapidly to completion at room temperature and pressure, complete conversion to the desired erythromycylamine compound normally occurring within about 1 hour. It can therefore be seen that the process of the present invention avoids the very high hydrogen pressures of from 500 to 2,000 p.s.i. and long reaction times of up to 40 hours encountered in the prior art process for reducing erythromycin hydrazone or its N′-isopropylidene derivative, as well as being considerably more economic than the prior art process.

The erythromycylamine compounds of Formula I produced by the process of the present invention are erythromycyl A and B amines and their corresponding epistereoisomers. The structure of these compounds may be shown as follows:

| Compound | $R_1$ | $R_2$ | $R_3$ |
|---|---|---|---|
| Erythromycyl: | | | |
| A amine | H | $NH_2$ | OH |
| B amine | H | $NH_2$ | H |
| Epi-erythromycyl: | | | |
| A amine | $NH_2$ | H | OH |
| B amine | $NH_2$ | H | H | and the term "erythromycylamine compound(s)" used herein is intended to include all of the erythromycylamines shown above.

In the reduction of an imine of Formula II to the amine using a complex metal hydride such as sodium borohydride, substantially complete conversion of the erythromycin A imine and erythromycin B imine to the corresponding A and B amines is achieved, the reaction apparently being stereo selective. Using other reduction systems, varying amounts of the epi-A amine and epi-B amine may be isolated. The products of the process of the present invention are normally isolated by evaporation of the reaction solvent or by solvent extraction.

The imines of Formula II are novel compounds and accordingly form a part of this invention. They may be prepared by a process comprising subjecting the corresponding hydrazone or azine derivative of Formula II

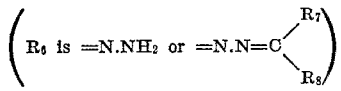

either to reduction by means of a metal of suitable redox potential, for example using zinc in acetic acid, the zinc preferably being in the form of an amalgam, or additionally, when $R_6$ is $=N.NH_2$ to nitrosation.

The reduction step proceeds smoothly, normally within ½ to 3 hours, by adding the metallic reducing agent gradually to the hydrazone or azine derivative dissolved in a suitable solvent such as methanol. Nitrosation of the hydrazone may be effected by nitrous acid, normally generated by the action of an acid, preferably hydrochloric acid, on an inorganic nitrite such as sodium or potassium nitrite, or an organic nitrite such as amyl nitrite. In the latter case, an aprotic solvent such as dioxan may be used in conjunction therewith. Nitrosation is preferably accomplished by adding the nitrite to a solution of the hydrazone or azine derivative in a suitable solvent such as methanol, cooling the solution to around 0–5° C. and then gradually adding the acid, whereupon conversion to the imine occurs almost immediately.

When the imine is to be used for subsequent reduction to the corresponding erythromycylamine compound, it need not be isolated prior to the reduction and accordingly a feature of the process of the present invention for preparing erythromycylamine compounds is the reduction, by the means defined above, of the imine in situ in the reaction medium in which it was formed from the corresponding hydrazone or azine derivative.

The novel imines of the present invention, i.e. erythromycin A imine and erythromycin B imine, were characterized by the facts that:

(a) The infra-red spectra show a C=N stretch at 1638–1640 cm.$^{-1}$ (KBr);

(b) When examined by thin layer chromatography on silica gel $F_{254}$, using 3:1 methanol:dimethyl formamide as the solvent system, the compounds have $R_f$ values intermediate between those of the corresponding hydrazones and the corresponding amines;

(c) The compounds gave satisfactory elemental analysis;

(d) The compounds are so readily reduced to the corresponding erythromycylamine compounds;

(e) The compounds are identical with the imines produced by an alternative process involving transition metal ion reduction of erythromycyl A and B oximes; the structure of the imines produced by the latter method were confirmed by carrying out a model reaction comprising the same transition metal ion reduction of methyl mesityl ketoxime to its imine which was identified spectroscopically and by conversion to its *known* hydrochloride. The aforementioned alternative method for preparing the novel imines of this invention is described and claimed in my co-pending application Ser. No. 125,400, filed this even date.

The compounds of Formula II where $R_6$ is $=N.NH_2$ are readily obtained by reaction of erythromycin A or erythromycin B with hydrazine hydrate in a suitable solvent such as methanol. The resultant hydrazone is converted to the azine of Formula II where $R_6$ is

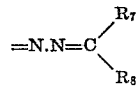

by treatment with the appropriate ketone or aldehyde of formula

Preferred azines are those formed with acetone, methylethyl ketone, methyl isopropyl ketone, benzaldehyde, acetophenone, o- or p-nitrobenzaldehyde, o- or p-nitroacetophenone, o- or p-tolualdehyde, cyclopentanone and cyclohexanone.

The erythromycylamine compounds of Formula I produced by the process of the present invention, and the imines of Formula II, possess antibiotic activity, particularly against gram-positive organisms, and accordingly may be used to treat infections in mammals caused by such organisms. For such use, the compounds will normally be administered in divided dosages of from 0.5 to 2 g. per day, admnistration usually taking place in the form of a pharmaceutical composition. The latter accordingly form a part of this invention and comprise a therapeutically useful amine of Formula I produced by the process of the present invention, or an imine of Formula II, in association with a pharmaceutically acceptable carrier therefor. Such compositions are prepared in a well-known manner, preferred compositions being capsules or tablets. The antibiotic amines and imines may also be used to control the population of staphylococci or streptococci present on equipment, furnishings, floors and walls of veterinary, dental and medical premises and in hospitals. For such use, pharmaceutical compositions of the present invention may be formulated as aqueous solutions, usually containing a surface active agent, and the solutions applied to the infected surfaces.

The following examples will further illustrate the present invention:

EXAMPLE 1

Erythromycin A hydrazone (2 g.) was dissolved in diethyl ether (50 ml.) containing a little methanol (2 ml.). To the stirred solution was added freshly amalgamated aluminium foil (4 g.) and the mixture stirred overnight. Thin layer chromatography indicated conversion to erythromycyl A amine in high yield.

The solution was dried with magnesium sulphate and the solvent removed by evaporation to give the erythromycylamine as a glassy solid. This was dissolved in a minimum of dry ether and after a few minutes crystals of erythromycyl A amine were deposited (M.P. 122.5–127° C.). Similarly, erythromycyl B amine was obtained by reduction of erythromycyl B hydrazone. The erythromycyl B amine was a white solid having a pKa in D.M.F. of 9.7 for the primary amino group and 8.3 for the dimethylamino group of the desosamine moiety. Satisfactory elemental analysis was also obtained. Reduction of the N′-isopropylidene derivative of erythromycin A hydrazone using the above described method also produced the required erythromycyl A amine in good yield, as did reduction of the azines formed with cyclohexanone, p-nitrobenzaldehyde and p-tolualdehyde.

EXAMPLE 2

Erythromycin A imine (2 g.) was dissolved in methanol (20 ml.) and sodium borohydride (50 mg., 2 fold excess) added. The solution was stirred for 30 minutes at room temperature. The pH of the solution was adjusted to 2.5 by addition of 3 N HCl and this solution was kept at room temperature for 5 minutes.

Water was added and the solution was extracted with methylene chloride at pH 6.0; 7.0; 8.0; 9.0; 10.0 and 11.0. Each extract was examined by thin layer chromatography. The extracts containing erythromycyl A amine were combined and dried over $MgSO_4$. The solvent was evaporated and the resulting glassy solid dissolved in the minimum volume of diethyl ether. Crystalline erythromycyl A amine was deposited after a few minutes, M.P. 125–127° C. Yield 1.3 g. (65%). Using the same reduction method applied to the erythromycin B imine, erythromycyl B amine was obtained.

EXAMPLE 3

Erythromycin B imine (1 g.) was dissolved in methanol (20 ml.) and hydrogenated over Adam's catalyst ($PtO_2$, 250 mg.) at 60 p.s.i. for 24 hours. Thin layer chromatography showed complete reduction of the intermediate compound to erythromycyl B amine. The product was isolated by solvent extraction as described in Example 2. Similarly, using palladium on charcoal as catalyst and erythromycin A imine, erythromycyl A amine was obtained.

EXAMPLE 4

Erythromycin A imine (1 g.) was dissolved in diethyl ether (20 ml.). Aluminium foil (4 gm.) was amalgamated by allowing small pieces to stand in aqueous mercuric chloride solution for a few minutes. The foil was washed with water and added gradually without drying, to the ethereal solution.

Reduction to erythromycyl amine was complete in about 2 hours as determined by thin layer chromatography.

Anhydrous magnesium sulphate was added and after filtration the solvent was removed by evaporation.

The erythromycyl A amine was purified by the gradient pH extraction described in Example 2.

Epi-erythromycyl A amine (M.P. 177–180° C. from ether) was obtained from the most basic extraction solution. Similarly erythromycyl B amine and epi-erythromycyl B amine were obtained from erythromycin B imine.

EXAMPLE 5

Erythromycin A hydrazone (2 g.) was dissolved in methanol (50 ml.) and solid sodium nitrite (2 g.) was added. Sufficient water (ca. 5 ml.) to dissolve the sodium nitrite was added and the solution cooled to 0–5° C. Gradual addition of 3 N HCl (6 ml.) gave almost complete conversion (t.l.c. analysis) to the intermediate compound, erythromycin A imine.

The solution was made alkaline (pH 10) by addition of 2 N NaOH and the product extracted 3 times into methylene chloride.

The combined organic layers were dried over magnesium sulphate and the solvent removed under reduced pressure. The product, erythromycin A imine, was obtained as a white glassy solid (1.85 g.). Similarly, erythromycin B imine was obtained from erythromycin B hydrazone.

EXAMPLE 6

Erythromycin A hydrazone (1 g.) was dissolved in methanol (10 ml.) and amyl nitrite (0.5 g.) added. The solution was cooled to 0–5° C. and methanolic hydrogen chloride was added gradually. Thin layer chromatography showed conversion to the imine intermediate compound. The volatile compounds were removed under reduced pressure and the residue dissolved in methanol (20 ml.). Sodium borohydride (0.5 g.) was added and the solution stirred for 30 minutes. Erythromycyl A amine was isolated as described in Example 2.

EXAMPLE 7

Erythromycin A hydrazone (3 g.) was dissolved in methanol (50 ml.) and glacial acetic acid (10 ml.) added. Amalgamated zinc powder (10 g.) was added and the solution stirred for 30 minutes. Thin layer chromatography showed partial reduction to the intermediate compound. A further 30 g. amalgamated zinc powder and 30 ml. glacial acetic acid, added gradually, gave complete reduction to the erythromycin A imine. The residual zinc was filtered off and the product isolated by solvent extraction into methylene chloride from an aqueous solution at pH 10. The solution was dried over magnesium sulphate and the solvent removed under reduced pressure giving the intermediate compound erythromycin A imine (2.5 g.) as a glassy solid.

This product (250 mg.) was dissolved in methanol (5 ml.) and excess sodium borohydride (50 mg.) added. The solution was stirred for 30 minutes after which time thin layer chromatography showed reduction to the erythromycyl A amine in good yield. This was isolated as described in Example 2. Similarly, erythromycin B imine and the B amine were obtained from the N'-isopropylidene derivative i.e. the azine with acetone, of erythromycin B hydrazone.

EXAMPLE 8

Erythromycin A hydrazone (15 g.) was dissolved in methanol (300 ml.) and sodium nitrite (7.5 g.) added. Water (ca. 30 ml.) was added to dissolve the sodium nitrite. The solution was cooled to 0–5° C. and 3 N hydrochloric acid (45 ml.) added dropwise at such a rate that the temperature did not exceed 10° C.

After addition of all the acid, thin layer chromatography indicated almost quantitative conversion to the imine. 2 N sodium hydroxide was added to the cooled solution to bring the pH to 8.0. Sodium borohydride (0.6 g.) was added and the solution stirred for 30 minutes at 10° C. The pH of the solution was adjusted to 2.5 by addition of HCl and the solution allowed to stand for 10 minutes. The product was isolated by extraction (×3) into methylene chloride from an aqueous solution at pH 11. The combined extracts were dried over magnesium sulphate and the solvent removed under reduced pressure, given erythromycyl A amine (12.4 g.) in a glassy solid. This was dissolved in the minimum of diethyl ether and crystals of the erythromycyl A amine were deposited (10.3 g., M.P. 125–128° C.).

I claim:

1. Process for preparing erythromycylamine compounds of the formula:

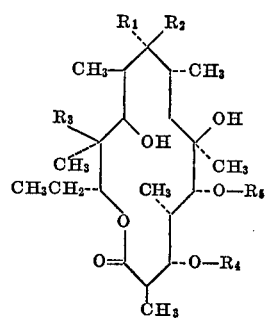

wherein $R_1$ and $R_2$ are the same or different members of the group consisting of hydrogen and amino, $R_3$ is a member of the group consisting of hydrogen and hydroxyl, $R_4$ is cladinosyl and $R_5$ is desosaminyl, which process consists essentially of subjecting an erythromycin derivative of the formula:

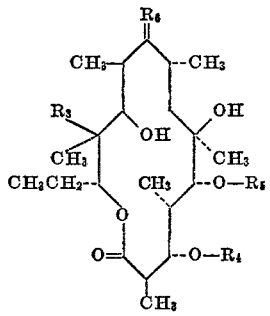

wherein $R_3$, $R_4$, and $R_5$ are as defined hereinabove, $R_6$ is a member of the group consisting of

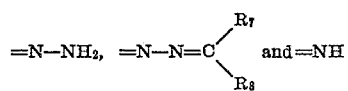

$R_7$ is a member of the group consisting of hydrogen and $C_{1-4}$ alkyl, $R_8$ is a member of the group consisting of $C_{1-4}$ alkyl, phenyl, nitrophenyl or tolyl and $R_7$ and $R_8$ when taken together with the carbon to which they are attached represent $C_{5-7}$ cycloalkylidene, to reduction by means of sodium or aluminum, optionally in the form of an amalgam.

2. A compound of the group consisting of erythomycin A imine and erythromycin B imine.

3. A process for preparing a compound from the group consisting of erythromycin A imine and erythromycin B imine, comprising subjecting an erythromycin derivative of the formula:

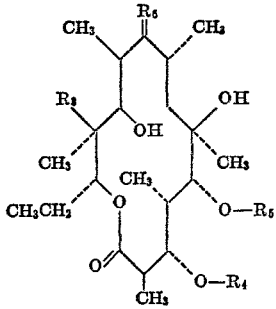

wherein $R_3$ is selected from the group consisting of hydrogen and hydroxyl, $R_4$ is cladinosyl, $R_5$ is desosaminyl and $R_6$ is a member of the group consisting of

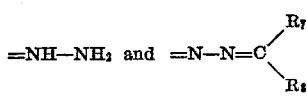

wherein $R_7$ is selected from the group consisting of hydrogen and $C_{1-4}$ alkyl, $R_8$ is selected from the group consisting of $C_{1-4}$ alkyl, phenyl, nitrophenyl or tolyl and $R_7$ and $R_8$ when taken together with the carbon atom to which they are attached, represent $C_{5-7}$ cycloalkylidene, to reduction by means of zinc in acetic acid.

4. A process for preparing a compound of the group consisting of erythromycin A imine and erythromycin B imine, comprising subjecting an erythromycin derivative of the formula:

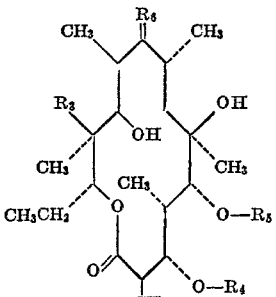

wherein $R_3$ is selected from the group consisting of hydrogen and hydroxyl, $R_4$ is cladinosyl, $R_5$ is desosaminyl and $R_6$ is =N—$NH_2$ to nitrosation.

5. A process as claimed in claim 1 wherein an azine of the formula:

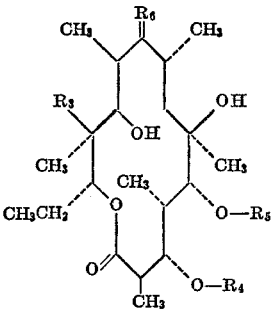

in which $R_3$ is a hydrogen atom or a hydroxy group, $R_4$ is a cladinosyl group, $R_5$ is a desosaminyl group and $R_6$ is

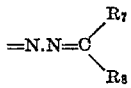

wherein the grouping

is derived from acetone, methylethyl ketone, methylisopropyl ketone, benzaldehyde, acetophenone, o- or p-nitrobenzaldehyde, o- or p-nitroacetophenone, o- or p-tolualdehyde, cyclopentanone or cyclohexanone.

6. A process according to claim 4 in which the nitrosation is provided by the action of nitrous acid generated by the action of an acid on sodium nitrite, potassium nitrite, or amyl nitrite.

References Cited
UNITED STATES PATENTS 3,478,014  11/1969  Djokic et al. _____ 260—210 E

OTHER REFERENCES

Synthetic Organic Chem., Wagner et al., 1953, John Wiley & Sons, Inc., New York, pp. 658–660.

Pigman: The Carbohydrates, 1957, Academic Press, Inc., New York, pp. 449–450.

Wildsmith, Eric, et al.: "Chem. Abst.," vol. 74, 1971, p. 76258P.

JOHNNIE R. BROWN, Primary Examiner

U.S. Cl. X.R.

424—181

UNITED STATES PATENT OFFICE
CERTIFICATE OF CORRECTION

Patent No. 3,790,559        Dated February 5, 1974

Inventor(s) Eric Wildsmith

It is certified that error appears in the above-identified patent and that said Letters Patent are hereby corrected as shown below:

Column 2, line 6, in the structure, "$R_2$" should be --$R_3$--.

Column 6, line 45, "given" should be --giving--.

Signed and Sealed this

Twenty-fourth Day of August 1976

[SEAL]

Attest:

RUTH C. MASON
*Attesting Officer*

C. MARSHALL DANN
*Commissioner of Patents and Trademarks*